Oct. 20, 1970 S. G. MAGNUSSON 3,535,606
MAGNETIC TAPE TRANSPORT CAPSTAN SPEED CONTROL CIRCUIT
Filed April 22, 1968
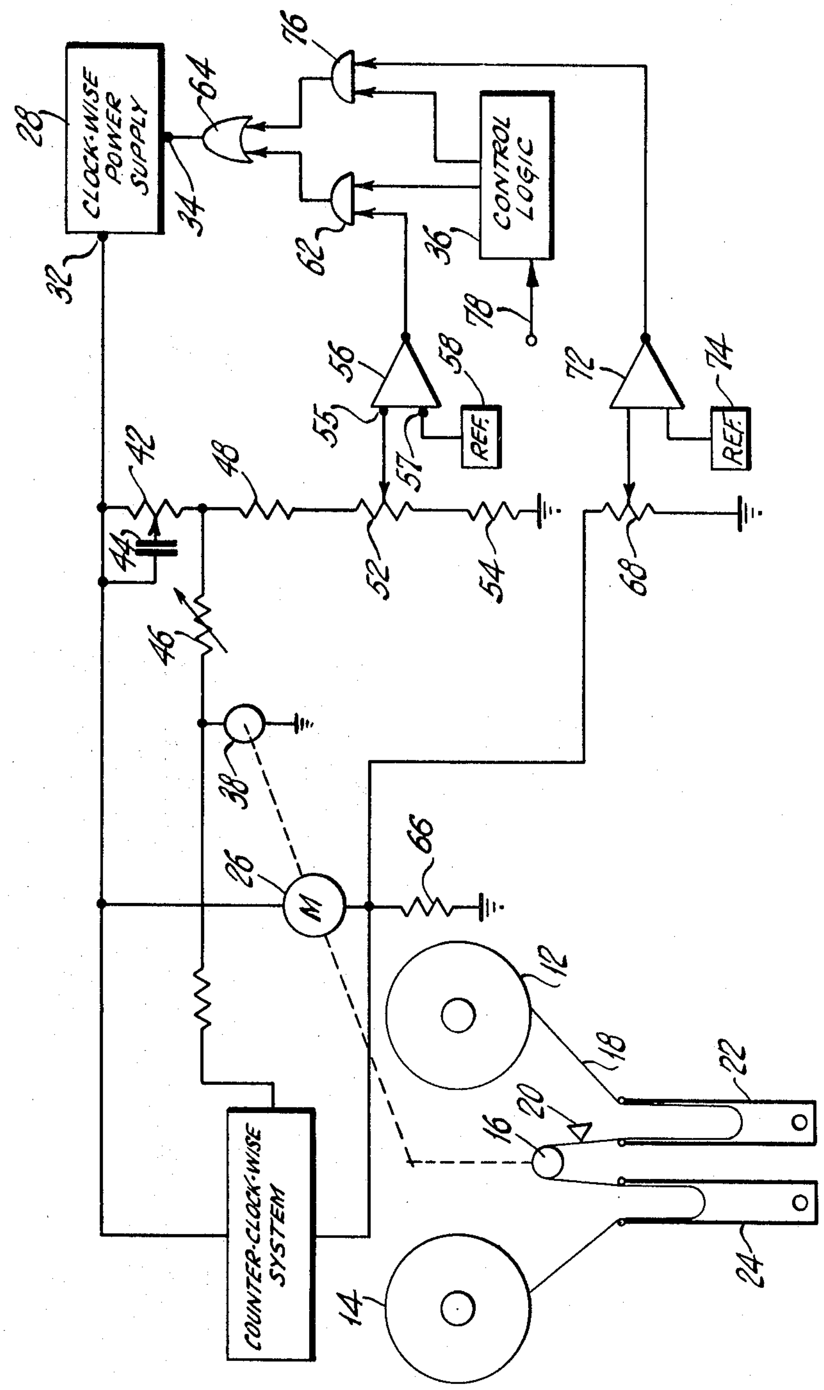
INVENTOR
SVEN G. MAGNUSSON
BY Laurence J. Marhoefer
ATTORNEY United States Patent Office 3,535,606
Patented Oct. 20, 1970

3,535,606

MAGNETIC TAPE TRANSPORT CAPSTAN SPEED CONTROL CIRCUIT

Sven G. Magnusson, Huntington, N.Y., assignor to Potter Instrument Company, Inc., Plainview, N.Y., a corporation of New York Filed Apr. 22, 1968, Ser. No. 723,084
Int. Cl. H02p 5/06
U.S. Cl. 318—308 4 Claims

ABSTRACT OF THE DISCLOSURE

The specification and claims describe a circuit for maintaining constant the speed of a capstan drive motor. A tachometer feedback signal that is a function of the speed of the capstan drive motor and signal that is a function of the voltage applied to the motor and the frequency of change of applied voltage are added to produce a broad-band feedback signal for controlling the speed of the motor.

BACKGROUND OF THE INVENTION

This invention relates to a single capstan magnetic tape transpart and, more particularly, to a circuit for maintaining constant the speed of the capstan drive motor.

When energized by a constant voltage, low inertia direct current (D.C.) motors such as those known as printed circuit motors are able to maintain the speed of a magnetic tape constant within commercially acceptable tolerances for short periods of time. However, such motors thusly energized have proved unsatisfactory for certain magnetic tape transport applications because brush wear, power supply variations, heat, and other similar factors cause the speed of the motor to change over periods measured in hours even though the applied voltage remains constant.

Tachometer feedback circuits are well known in the art for maintaining the speed of a motor constant. However, while such tachometer feedback circuits satisfactorily prevent any long-term variation in motor speed, they, themselves have been found to introduce short-term speed variations (due principally to commutator ripple) which may exceed the allowable limits for speed variation in a magnetic tape transport.

One object of this invention is the provision of a tachometer feedback motor speed control system which provides good long-term speed stability without introducing high frequency velocity fluctuations in the tape.

A further object of the invention is the provision of such a speed control system that is fast acting.

Another object of this invention is to provide the capstan motor with a speed control system which does not affect the starting and stopping characteristics of the motor.

SUMMARY OF THE INVENTION

Briefly, this invention contemplates the provision of a capstan motor speed control system in which a tachometer feedback loop prevents any long term motor speed variation or drift and a capacitively coupled voltage feedback loop prevents any high-frequency motor speed fluctuations due to ripple in the tachometer output. In the system contemplated by this invention, constant current applied for a fixed interval starts and stops the motor. The time constant of the capacitively coupled feedback loop is therefore adjusted so that the voltage across the capacitor equals the running voltage of the motor at the end of the fixed interval.

BRIEF DESCRIPTION OF THE DRAWING

Having briefly described this invention, it will be described in greater detail along with other objects and advantages in the following detailed description of a preferred embodiment which may be best understood by reference in the accompanying drawing, which is a schematic view of one embodiment of the invention. This drawing forms part of the instant specification and is to be read in conjunction therewith.

DESCRIPTION OF THE PREFERRED EMBODIMENT

Referring now to the drawing, a magnetic tape transport shown schematically has a file reel 12, a machine reel 14, and a centrally disposed capstan 16. The capstan 16 drives a magnetic tape 18 between the reels 12 and 14, and vacuum buffers 22 and 34 form loops in the tape 18 as is conventional in the art. A transducer 20 is disposed to record information on and read information from the tape. Two substantially identical systems provide for energizing a low inertia D.C. motor 26 which is directly coupled to the capstan; one for clockwise rotation and the other for counter-clockwise rotation. As the two systems are substantially identical, only the clockwise rotational system will be explained in detail.

A low inertia D.C. motor 26 directly coupled to the capstan 16 is energized for clockwise rotation from a power supply 28 whose output potential at terminal 32 is a function of the potential at its control terminal 34. A constant current, which is applied to the motor armature for a predetermined interval, is used for starting and stopping the motor. It should be noted that a constant current of one polarity is used for starting the motor for rotation in one direction and is used for stopping the motor if it had been rotating previously in the opposite direction. Once the motor is started, its speed is maintained constant principally by means of a feedback loop that includes a tachometer 38. Another feedback loop that includes a variable resistor 42 and capacitor 44 provides system stability and prevents high frequency velocity fluctuations due to commutator ripple in the tachometer output.

The output of tachometer 38, which is driven by the motor 26, is coupled via a resistor 46 and a voltage dividing network of resistors 48,, 52, and 54 to one input 55 of a differential amplifier 56 whose other input 57 is coupled to a source of reference potential 58. The output of amplifier 56 is coupled to the control terminal 34 of power supply 28 via an AND gate 62 and an OR gate 64.

The output voltage of tachometer 38 is proportional to its rotational speed so that if the speed of the motor 26 drifts downwardly, for example, the output of tachometer 38 decreases and the voltage at input terminal 55 of amplifier 56 decreases. When the potential at terminal 55 is less than the reference potential 58, the differential amplifier 56 has an output which is coupled to terminal 34 of power supply 28 and is of such polarity as to cause the potential on output terminal 32 to increase. This increased potential causes an increase in the speed of the motor 22 and, as a result, the output potential of tachometer 38 increases raising the potential at terminal 55 to equal the reference potential 58. When the potential at terminals 55 and 57 are equal, there is no error signal output from amplifier 56. It will be appreciated that the voltage applied to the armature of motor 26 is similarly decreased if the speed of the motor tends to increase.

The potential at terminal 32 of power supply is coupled also to the terminal 55 of amplifier 56 via a potentiometer 42 and capacitor 44 and voltage dividing network comprising resistors 48, 52, 54. It should be noted, therefore, that the potential at terminal 55 is a function of both of the output potential of tachometer 38 less the drop across resisor 46 and the potential at terminal 32 less the drop across the R–C network of potentiometer 42 and capacitor 44. The effect of changes in tachometer output relative to changes in potential at terminal 34 is proportional to the value of resistor 46 relative to the value of potentiometer 44 for low frequency changes. A system where the value of potentiometer 42 is about ten times as large as resistor 46 is typical. The effect of the potential feedback from terminal 34 increases as the frequency of the change in voltage at terminal 34 increases due to the capacitor 44, which shunts about fifty percent of the resistance of potentiometer 42. The R–C network and voltage divider network are so selected that any high frequency (20 kc. for example) changes in the output of tachometer 38 do not cause appreciable change in the speed of the motor.

In order to maintain the current through the motor 26 constant during starting and stopping the potential drop across a resistor 66 in a series with the armature of motor 26 is coupled via a potentiometer 68 to one input of a second differential amplifier 72. The other input to differential amplifier 72 is coupled to a source of reference potential 74 and its output is coupled via an AND gate 76 and the OR gate 64 to the control terminal 34 of power supply 28.

As explained more fully in the co-pending application of George C. Brown et al. entitled Capstan Motor Power Supply, Ser. No. 643,994, filed June 6, 1967, now Pat. No. 3,471,073, upon receipt of a start command signal from a suitable controller or computer known in the art, a control logic circuit 36 enables AND gate 76 and disenables AND gate 62 for a pre-determined interval. During this interval the voltage at the output terminal 32 of power supply 28 is so regulated via the feedback network that includes differential amplifier 72 that the current passing through the armature of the motor 26 is maintained constant. At the end of this interval AND gate 76 is disenabled and AND gate 62 is enabled. When this happens, the voltage at terminal 32 drops to a certain lower value sufficient to maintain the motor running at the speed it has attained at the end of the fixed interval. The speed of the motor is thereafter regulated by the feedback network that includes differential amplifier 56. The time constant of the R–C network of capacitor 44 and potentiometer 42 is adjusted by adjusting the potentiometer 42 so that the voltage across the capacitor at the end of he fixed tarting (and stopping) interval equals the running voltage for the motor. In this manner, the starting and stopping characteristics of the motor 26 are unaffected by the frequency dependent feedback loop.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific deails shown and described.

What is claimed is:

1. In a magnetic tape transport having a single capstan which engages a magnetic tape continuously during starting, stopping and transporting the tape, a circuit for maintaining constant the speed of the capstan drive motor, comprising in combination:

a motor coupled to said capstan for starting, stopping and driving said capstan, a power supply having an output terminal coupled to said capstan drive motor and a control terminal, the voltage at said output terminal being a function of an input signal ot said control terminal, means including a tachometer for producing a first signal that is a function of the speed of said capstan drive motor, means including a high pass filter for producing a second signal that is a function of the voltage applied to said capstan drive motor and the frequency of change of said applied voltage, said second signal increasing as the frequency of the change of said applied voltage increases, means for summing said first and said second signals, a difference amplifier having one output terminal and two input terminals, one of which is coupled to a source of reference potential, and means for coupling the sum of said first and second signals from said summing means to the other input terminal of said difference amplifier and means for coupling the output terminal of said difference amplifier to the control terminal of said power supply in order to maintain constant the speed of said capstan drive motor.

2. In a magnetic tape transport as in claim 1 wherein said high pass filter includes a capacitor shunting a variable resistor.

3. In a magnetic tape transport as in claim 2 further including means for starting and stopping said capstan drive motor by applying a constant current to said capstan drive motor for a predetermined interval.

4. In a magnetic tape transport as in claim 3 wherein said resistor shunted by said capacitor is a variable resistor and the time constant of said resistance capacitance network is adjusted so that the voltage across said capacitor at the end of said predetermined starting interval approximately equals voltage across said capacitor during constant speed operation of said capstan drive motor.

References Cited

UNITED STATES PATENTS 3,411,063 11/1968 Schoonover -------- 318—331

ORIS L. RADER, Primary Examiner

ROBERT J. HICKEY, Assistant Examiner

U.S. Cl. X.R.

318—326